(12) United States Patent
Chen et al.

(10) Patent No.: US 12,504,628 B2
(45) Date of Patent: Dec. 23, 2025

(54) ROTARY STRUCTURE MODULE AND HEAD-UP DISPLAY DEVICE

(71) Applicant: Coretronic Corporation, Hsin-Chu (TW)

(72) Inventors: Chi-Chen Chen, Hsin-Chu (TW); Hung-Lin Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 538 days.

(21) Appl. No.: 17/993,874

(22) Filed: Nov. 24, 2022

(65) Prior Publication Data
US 2023/0168504 A1 Jun. 1, 2023

Related U.S. Application Data

(60) Provisional application No. 63/284,006, filed on Nov. 30, 2021.

(30) Foreign Application Priority Data

Jan. 21, 2022 (CN) .......................... 202210072718.6

(51) Int. Cl.
*G02B 27/01* (2006.01)
*G02B 26/08* (2006.01)

(52) U.S. Cl.
CPC ..... *G02B 27/0149* (2013.01); *G02B 27/0101* (2013.01); *G02B 26/0816* (2013.01);
(Continued)

(58) Field of Classification Search
CPC ........ G02B 27/0149; G02B 2027/0154; G02B 2027/0159; G02B 2027/0169
See application file for complete search history.

(56) References Cited

U.S. PATENT DOCUMENTS 3,892,474 A * 7/1975 Nilsson ................ G02B 7/1828
356/147
9,291,819 B2 * 3/2016 Ferri .................. G02B 27/0101
(Continued)

FOREIGN PATENT DOCUMENTS

CN 109643016 4/2019
CN 110730924 A 1/2020
(Continued)

OTHER PUBLICATIONS

English machine translation of JP-2021167875-A (Year: 2021).*
"Office Action of China Counterpart Application", issued on Aug. 30, 2025, p. 1-p. 7.

*Primary Examiner* — Nicholas R. Pasko
(74) *Attorney, Agent, or Firm* — JCIPRNET

(57) ABSTRACT

A rotary structure module applied to a head-up display device includes a curved mirror assembly, at least one bracket and a driving element. The curved mirror assembly has a rotation axis, and includes a curved mirror, a fixing frame, a rotating shaft and a counterweight. The rotation axis corresponds to the rotating shaft, and the rotating shaft is passed through the fixing frame. The curved mirror and the counterweight are respectively fixed on two opposite sides of the fixing frame and located on two sides of the rotating shaft, so that the center of gravity of the curved mirror assembly is overlapped with the rotating axis. The bracket is sleeved on the rotating shaft, and the driving element drives the curved mirror assembly, so that the curved mirror rotates around the rotating shaft as the rotation axis.

11 Claims, 10 Drawing Sheets

(52) U.S. Cl.
CPC ............... *G02B 2027/0154* (2013.01); *G02B 2027/0159* (2013.01); *G02B 2027/0169* (2013.01)

(56) References Cited

U.S. PATENT DOCUMENTS

| | | | |
|---|---|---|---|
| 2019/0265582 A1* | 8/2019 | Sakai | G02B 5/10 |
| 2020/0033600 A1* | 1/2020 | Kweon | G02B 17/02 |
| 2020/0142191 A1* | 5/2020 | Itsede | G02B 27/0149 |
| 2020/0363637 A1* | 11/2020 | Uto | G02B 7/1821 |
| 2021/0003815 A1* | 1/2021 | Tabata | B60K 35/53 |
| 2021/0011286 A1 | 1/2021 | Morohashi et al. | |
| 2021/0080718 A1* | 3/2021 | Sato | G02B 27/0101 |
| 2024/0075813 A1* | 3/2024 | Le Toumelin | G02B 27/0149 |
| 2024/0402461 A1* | 12/2024 | Sato | G02B 7/198 |

FOREIGN PATENT DOCUMENTS

| | | | | |
|---|---|---|---|---|
| CN | 111552074 | | 8/2020 | |
| CN | 112449686 | | 3/2021 | |
| CN | 213092017 U | | 4/2021 | |
| DE | 102019120466 A1 * | | 2/2021 | ........... G02B 7/1827 |
| JP | 2021167875 | | 10/2021 | |
| JP | 2021167875 A * | | 10/2021 | |

* cited by examiner

1

ROTARY STRUCTURE MODULE AND HEAD-UP DISPLAY DEVICE

CROSS-REFERENCE TO RELATED APPLICATION

This application claims the priority benefit of U.S. provisional application Ser. No. 63/284,006, filed on Nov. 30, 2021 and China application serial no. 202210072718.6, filed on Jan. 21, 2022. The entirety of each of the above-mentioned patent applications is hereby incorporated by reference herein and made a part of this specification.

BACKGROUND

Technology Field

The disclosure relates to a vehicle electronic component, and particularly, to a rotary structure module and a head-up display device using the rotary structure module.

Description of Related Art

Head-up displays (HUDs) are widely used in airplane, land vehicles, retail store windows to present information superimposed on the surrounding environment to the users. Many vehicle interior HUDs include image generators, flat mirrors, and curved mirrors. The image light provided by the image generator allows the driver to see the image displayed outside the vehicle through the windshield, the light that generates the image can be reflected to the eyes of the driver via the flat mirror, curved mirror, and windshield in sequence, and accordingly the enlarged virtual image is imaged to the other side (i.e., the outside of the vehicle) of the windshield, so that the driver can read the driving information provided by the vehicle information system without looking down at the dashboard or navigator when the vehicle is in motion. In order to match the eye height of different drivers, the inclination angle of the curved mirror must be adjustable, so as to adjust the clarity and image position of the image projected on the windshield.

At present, the center of gravity of the curved mirror of the head-up display is offset, so the weight of the curved mirror itself may generate torque on the rotation axis. However, this torque may result in provision of additional torque to rotate the curved mirror when adjusting the tilt angle of the curved mirror. In addition, a large torque motor or a high reduction ratio gear design is also required, thereby increasing the production cost and design complexity of the head-up display.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a rotary structure module capable of preventing external torque caused by the eccentricity of the curved mirror and reducing production cost and design complexity.

The disclosure also provides a head-up display device including the rotary structure module, which can provide good display quality.

Other objectives and advantages of the disclosure can be further understood from the technical features disclosed in the disclosure.

To achieve one, part of, or all of the objectives or other objectives, an embodiment of the disclosure provides a rotary structure module, applied to a head-up display device and including a curved mirror assembly, at least one bracket, and a driving element. The curved mirror assembly has a rotation axis, and the curved mirror assembly includes a curved mirror, a fixing frame, a rotating shaft, and a counterweight. The rotation axis corresponds to the rotating shaft, and the rotating shaft passes through the fixing frame. The curved mirror and the counterweight are fixed on two opposite sides of the fixing frame, respectively and are located at two sides of the rotating shaft, respectively. A center of gravity of the curved mirror assembly is overlapped with the rotation axis. The bracket is sleeved on the rotating shaft; and the driving element drives the curved mirror assembly so that the curved mirror rotates around the rotating shaft as the rotation axis.

To achieve one, part of, or all of the objectives or other objectives, an embodiment of the disclosure provides a head-up display device, including an image generating unit, at least one mirror, and a rotary structure module. The image generating unit includes at least one illumination system and a display panel. The illumination system provides at least one illumination beam to be transmitted to the display panel. The display panel has a first imaging surface and a second imaging surface disposed adjacent to each other and located on a same plane. The first imaging surface and the second imaging surface of the display panel receive the illumination beam to be converted into a first image beam and a second image beam, respectively. The rotary structure module includes a curved mirror assembly, at least one bracket, and a driving element. The first image beam and the second image beam are transmitted to a target element via the mirror and the curved mirror assembly sequentially to form a first virtual image and a second virtual image, respectively. The curved mirror assembly has a rotation axis. The curved mirror assembly includes a curved mirror, a fixing frame, a rotating shaft, and a counterweight. The rotation axis corresponds to the rotating shaft, and the rotating shaft passes through the fixing frame. The curved mirror and the counterweight are fixed on two opposite sides of the fixing frame, respectively and located on two sides of the rotating shaft, respectively so that a center of gravity of the curved mirror assembly is overlapped with the rotation axis. The bracket is sleeved with the rotating shaft. The driving element drives the curved mirror assembly, so that the curved mirror rotates around the rotating shaft as the rotation axis to adjust an incident angle of the curved mirror relative to the first image beam and the second image beam.

In summary, the embodiments of the disclosure have at least one of the following advantages or effects. In the design of the rotary structure module of the disclosure, the curved mirror assembly includes a counterweight; the curved mirror and the counterweight are fixed on two opposite sides of the fixing frame respectively and located on two sides of the rotating shaft respectively; and the center of gravity of the curved mirror assembly is overlapped with the rotation axis. Accordingly, external torque caused by eccentricity of the curved mirror can be prevented, and production cost and design complexity can be reduced. In addition, the head-up display device using the rotary structure module of the disclosure can provide good display quality.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWING

The accompanying drawings are included to provide a further understanding of the disclosure, and are incorporated in and constitute a part of this specification. The drawings illustrate examples of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component "component is directly "adjacent to" "B" component or one or more additional components are between "A" component and "B" component. Accordingly, the drawings and descriptions will be regarded as illustrative in nature and not as restrictive.

Figure 1A:
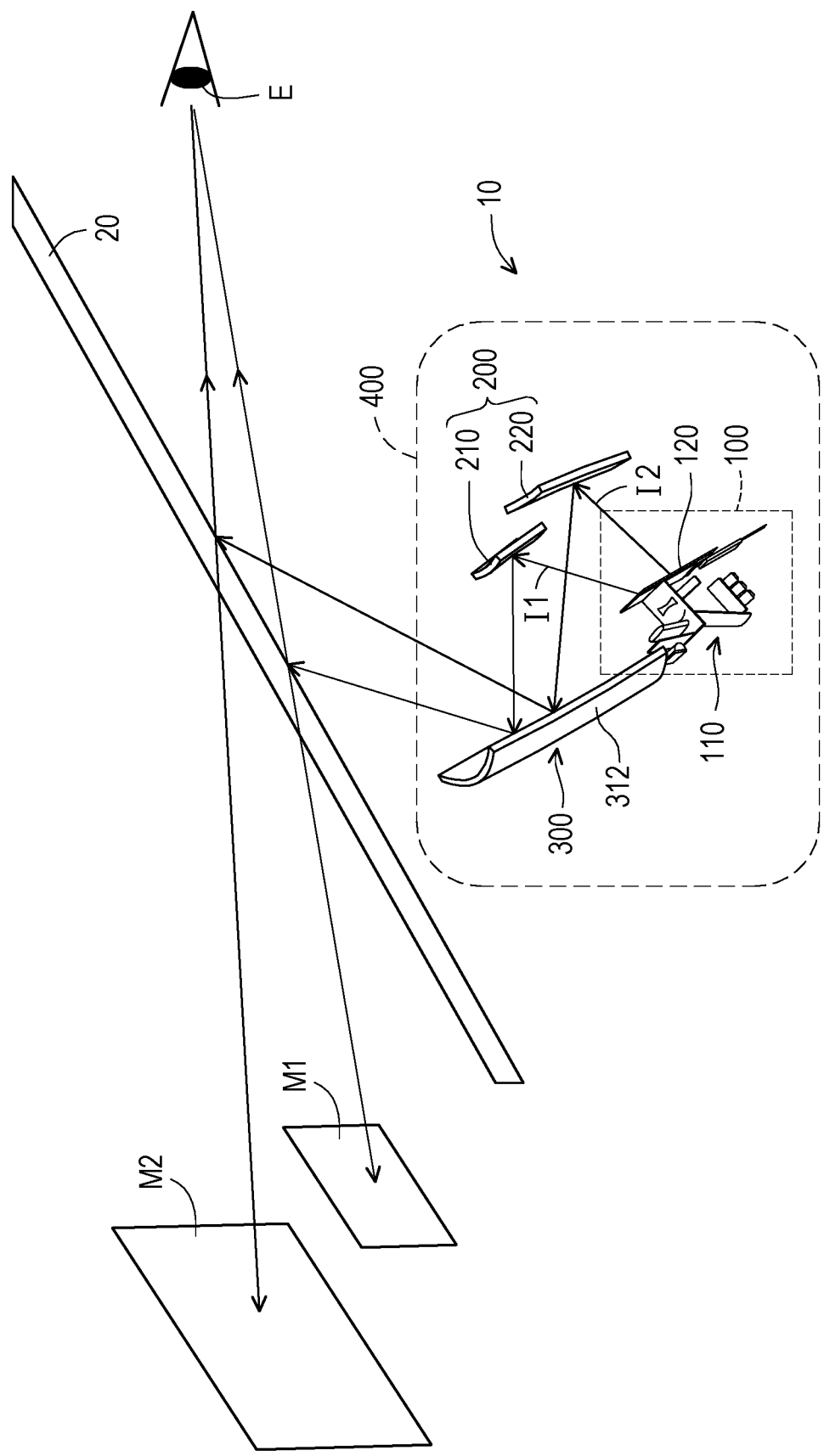
FIG. 1A is a schematic view of a head-up display device according to an embodiment of the disclosure.
Figure 1B:
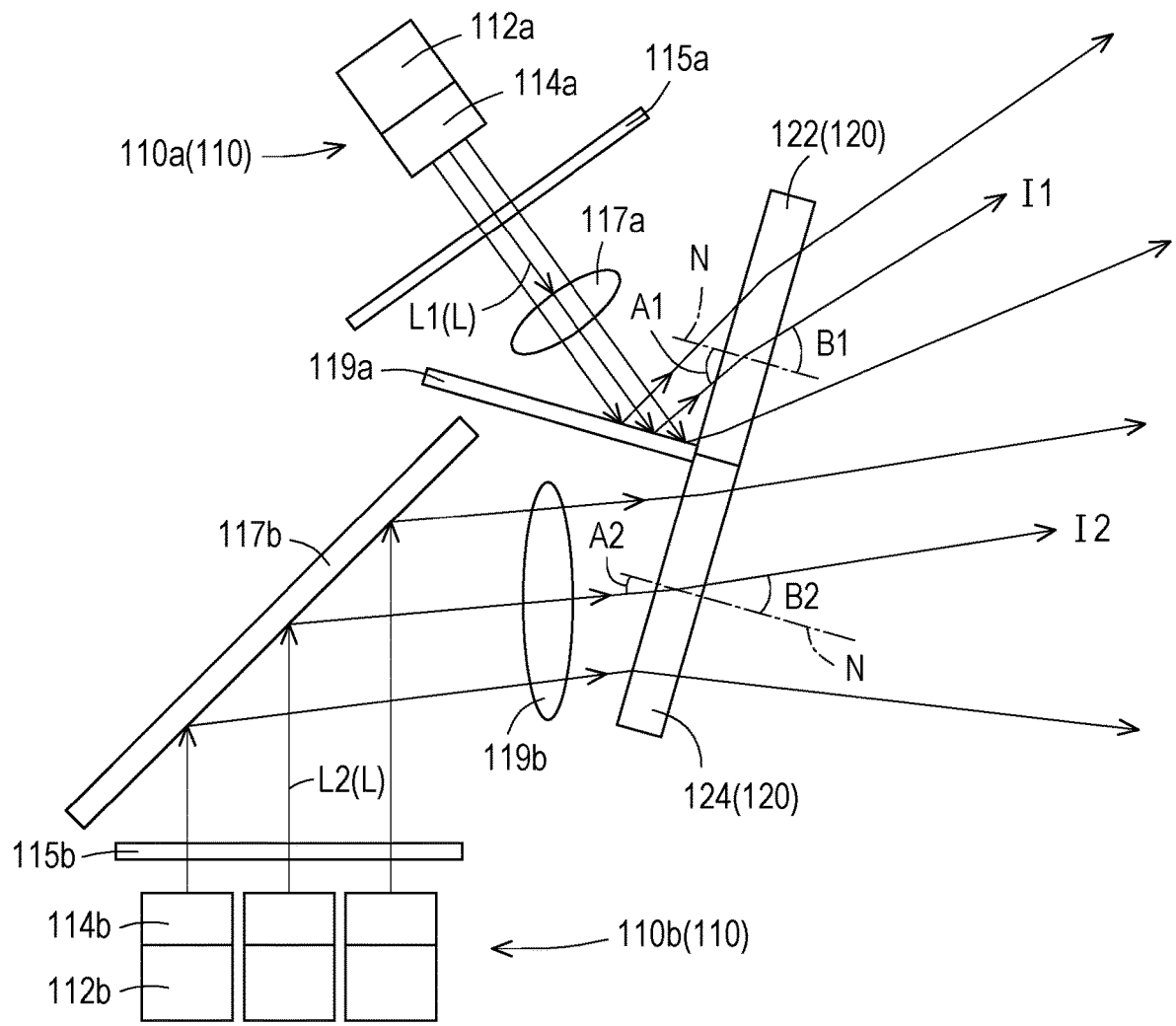
FIG. 1B is a schematic view of an image generating unit of the head-up display device of FIG. 1A.
Figure 2A:
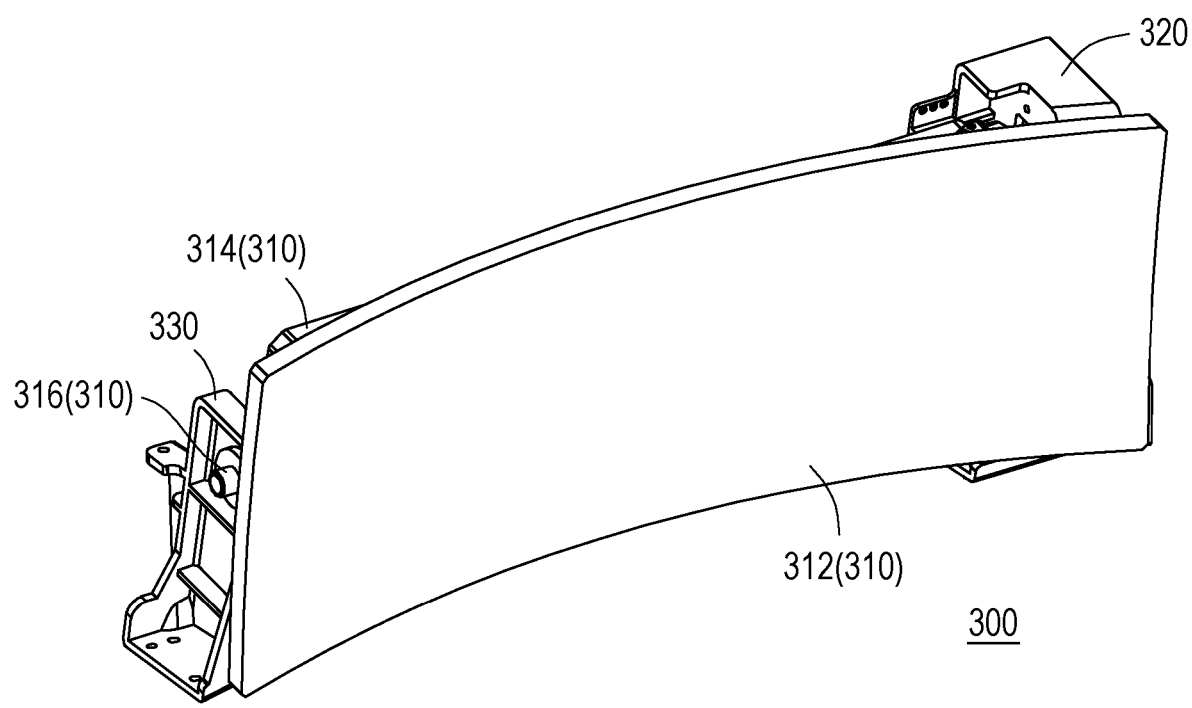
FIG. 2A is a schematic perspective view of a rotary structure module of the head-up display device of FIG. 1A.
Figure 2B:
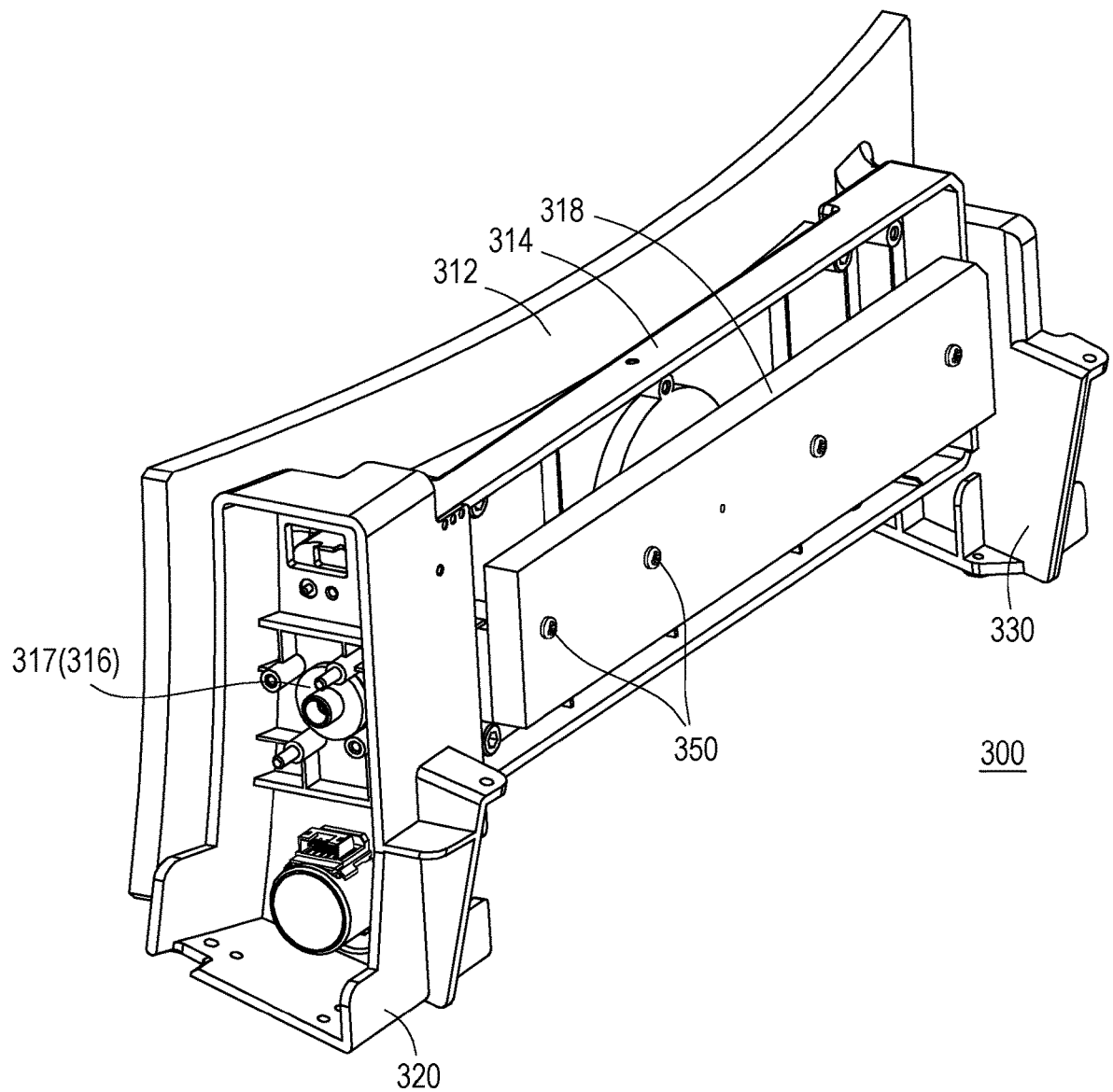
FIG. 2B is a schematic rear perspective view of the rotary structure module of FIG. 2A.
Figure 2C:
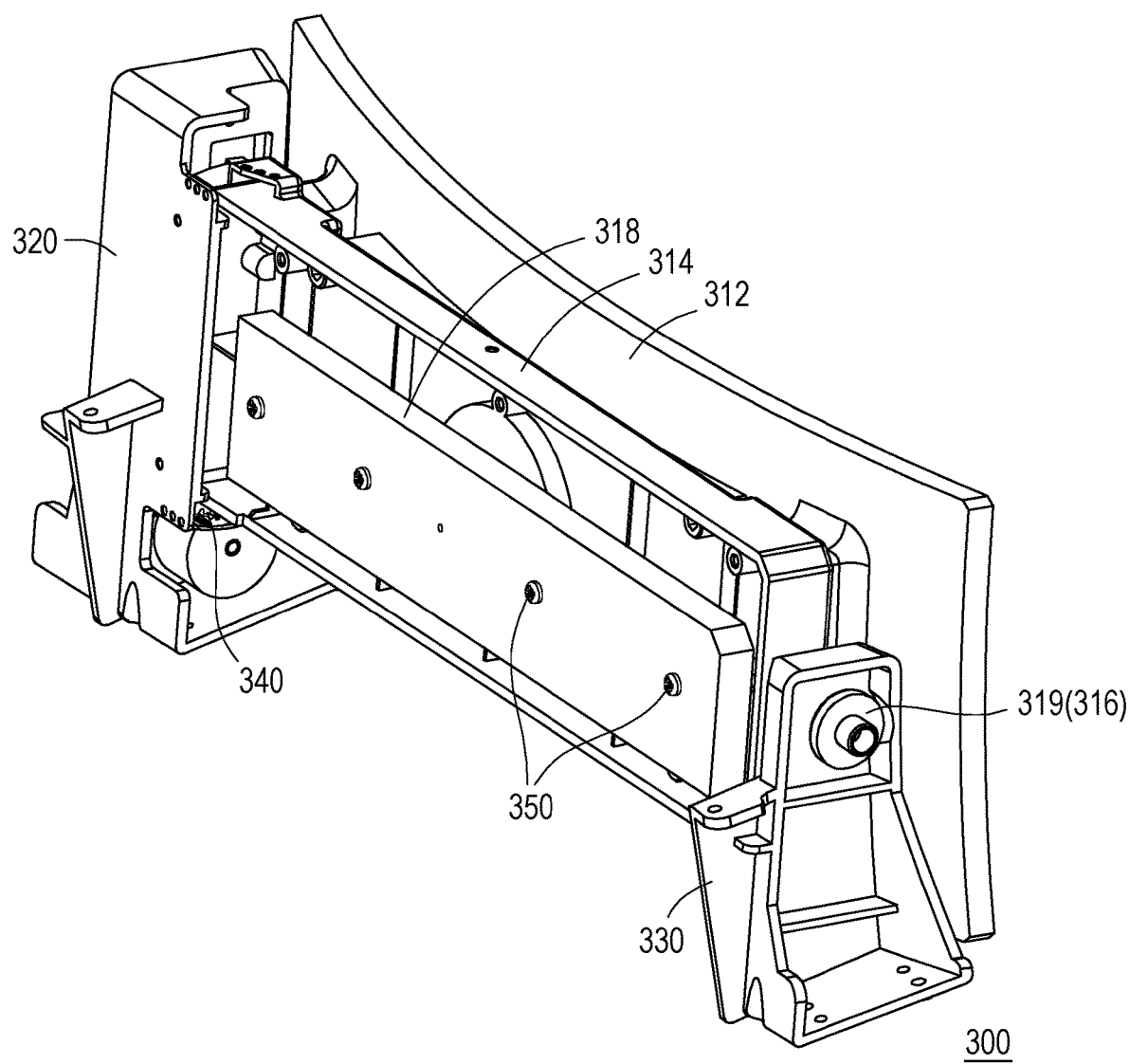
FIG. 2C is a schematic rear perspective view of the rotary structure module of FIG. 2A from another viewing angle.
Figure 2D:
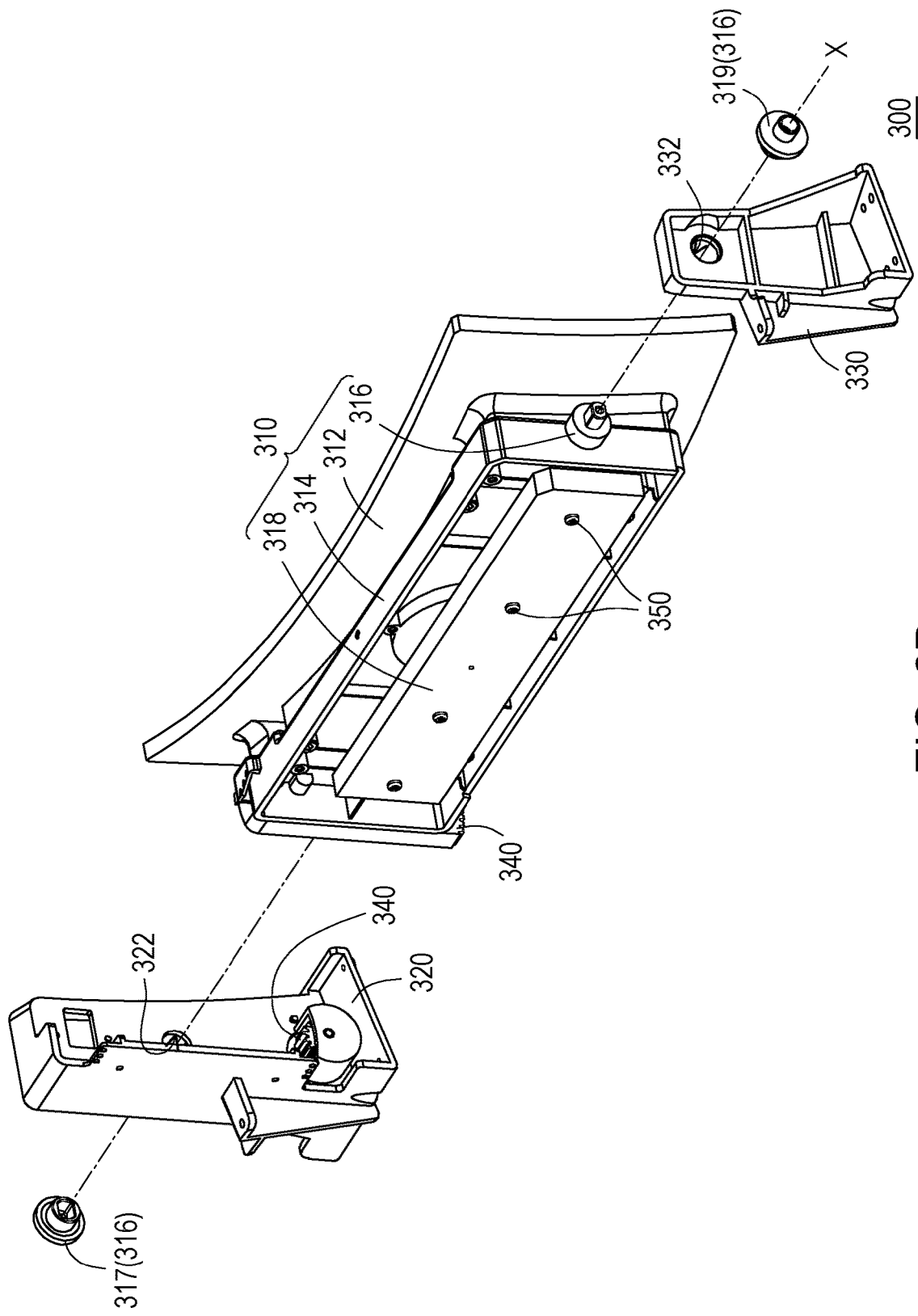
FIG. 2D and FIG. 2E are exploded perspective views of part of the rotary structure module of FIG. 2A, respectively.
Figure 2E:
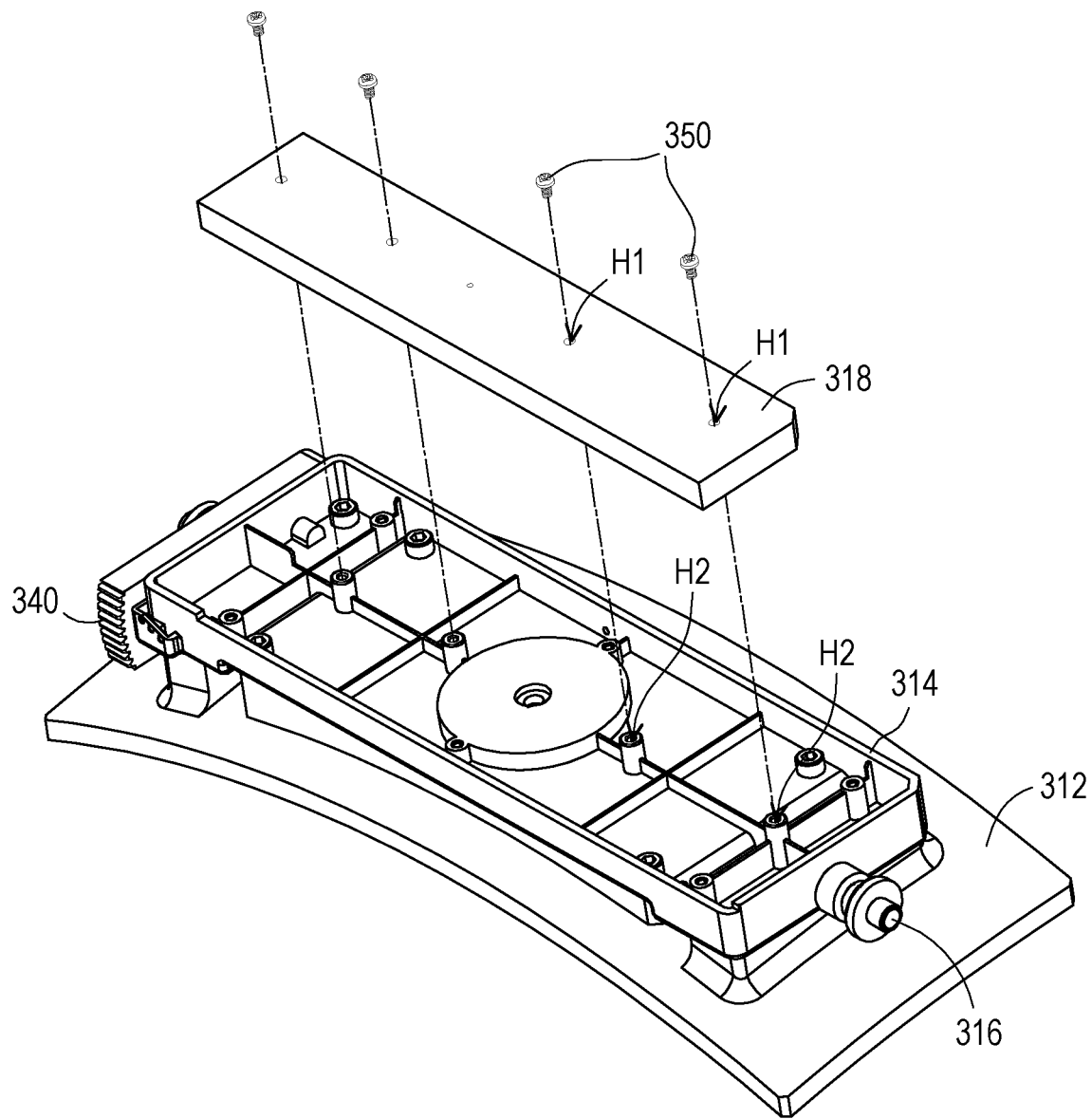
Figure 2F:
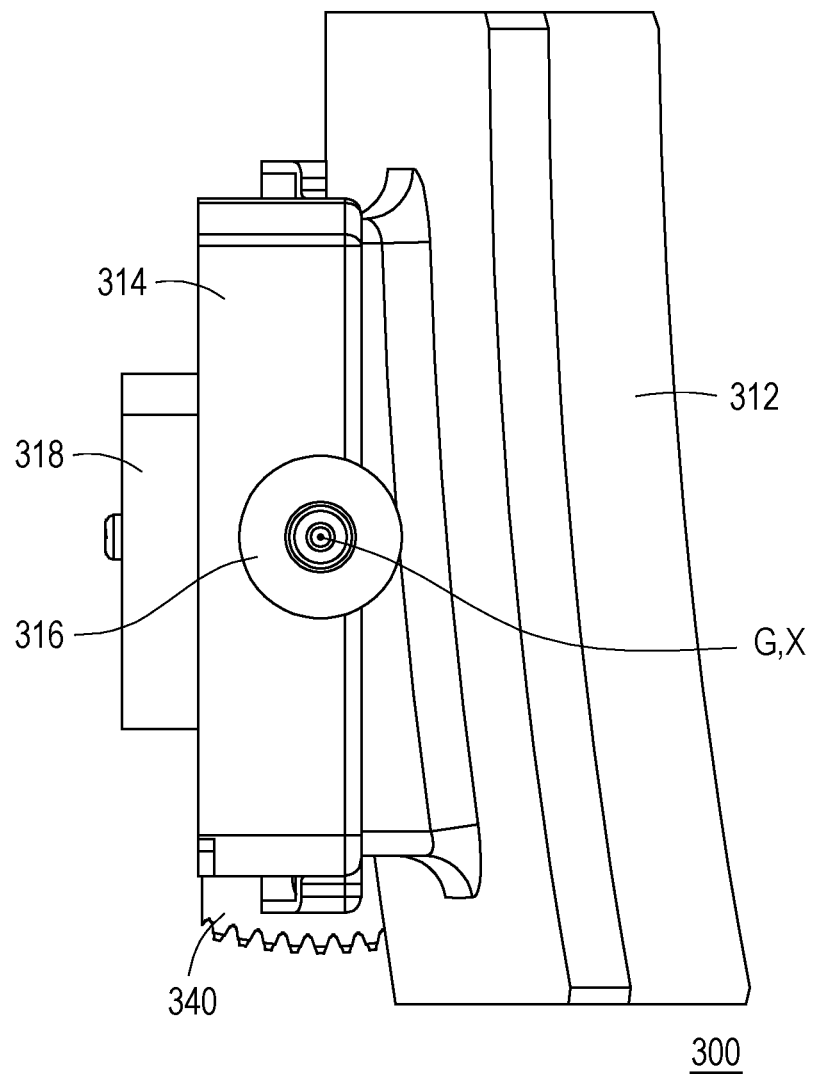
FIG. 2F is a side view of the rotary structure module of FIG. 2A.
Figure 2G:
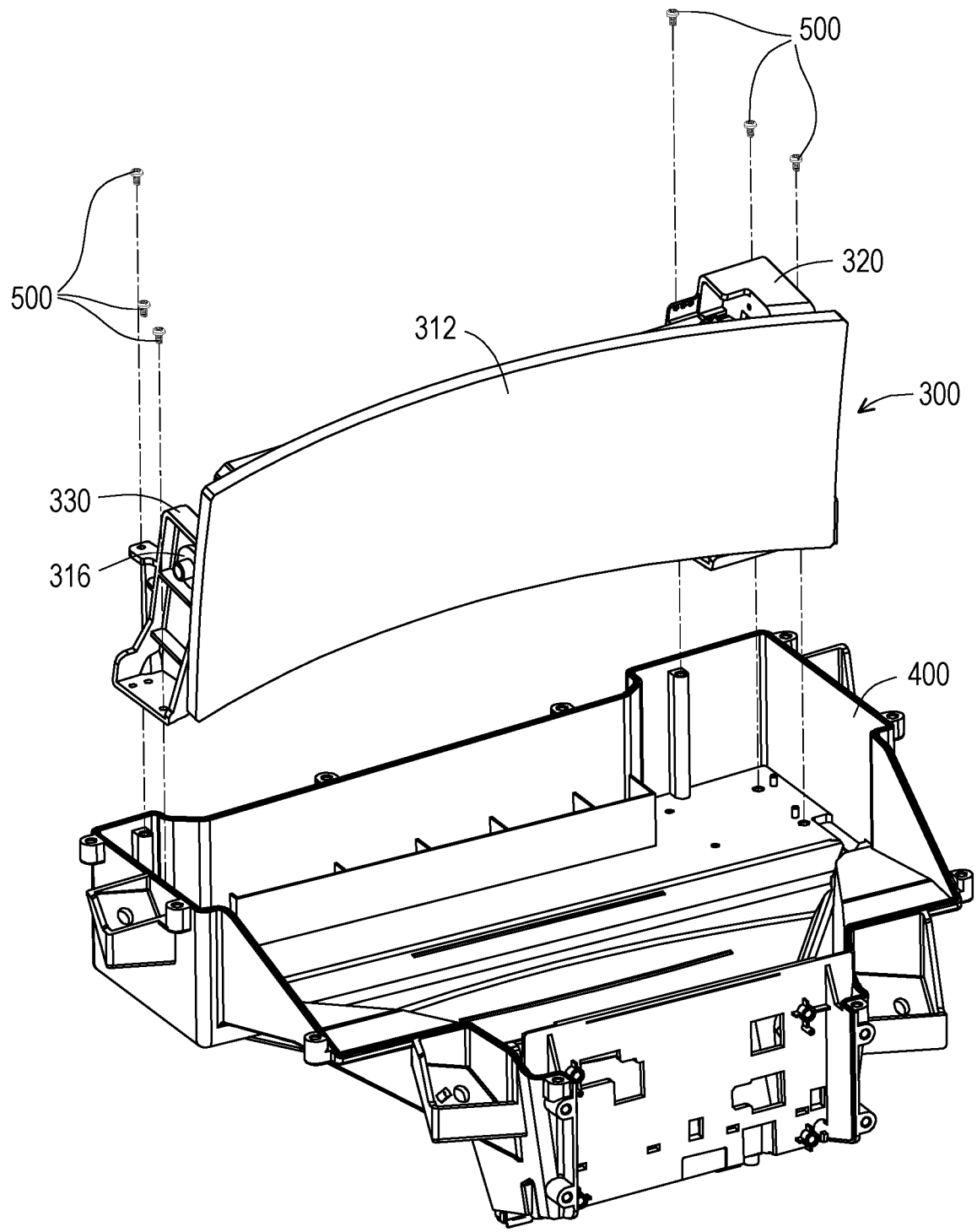
FIG. 2G is an exploded perspective view of the rotary structure module and part of the casing of the head-up display device of FIG. 1A.
Figure 2H:
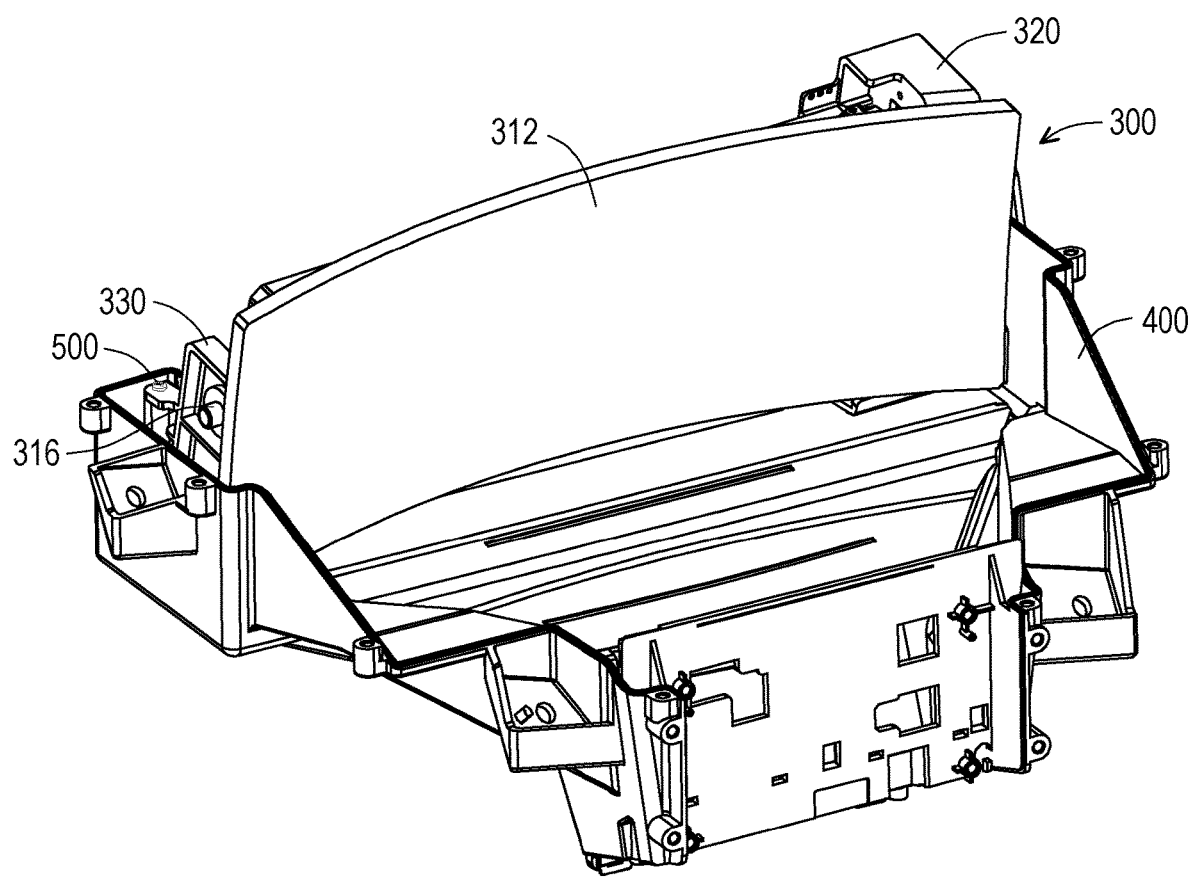
FIG. 2H is a schematic perspective view of the rotary structure module and part of the casing of the head-up display device of FIG. 1A.

FIG. 1A is a schematic view of a head-up display device according to an embodiment of the disclosure. FIG. 1B is a schematic view of an image generating unit of the head-up display device of FIG. 1A. FIG. 2A is a schematic perspective view of a rotary structure module of the head-up display device of FIG. 1A. FIG. 2B is a schematic rear perspective view of the rotary structure module of FIG. 2A. FIG. 2C is a schematic rear perspective view of the rotary structure module of FIG. 2A from another viewing angle. FIG. 2D and FIG. 2E are exploded perspective views of part of the rotary structure module of FIG. 2A, respectively. FIG. 2F is a side view of the rotary structure module of FIG. 2A. FIG. 2G is an exploded perspective view of the rotary structure module and the casing of the head-up display device of FIG. 1A. FIG. 2H is a schematic perspective view of the rotary structure module and the casing of the head-up display device of FIG. 1A. To facilitate the illustration, a bracket is omitted in FIG. 2E.

Referring to both FIG. 1A and FIG. 1B first, in the embodiment, a head-up display device 10 includes an image generating unit 100, at least one mirror 200, a rotary structure module 300, and a casing 400. The image generating unit 100, the at least one mirror 200 and the rotary structure module 300 are disposed in the casing 400. For example, the head-up display device 10 is configured in vehicles such as automobiles and installed under the dashboard of the automobile, for example, that is, the casing 400 is fixed under the dashboard of the automobile. The image generating unit 100 includes at least one illumination system 110 and a display panel 120, and the illumination system 110 provides at least one illumination beam L to be transmitted to the display panel 120. Meanwhile, the display panel 120 is a liquid crystal display panel 120, or other imaging elements having similar functions, for example.

In detail, referring to FIG. 1B, the illumination system 110 includes a first illumination system 110a and a second illumination system 110b, and the illumination beam L includes a first illumination beam L1 and a second illumination beam L2. The first illumination system 110a is configured for providing the first illumination beam L1, and the second illumination system 110b is configured for providing the second illumination beam L2. The display panel 120 has a first imaging surface 122 and a second imaging surface 124 disposed adjacent to each other and located on the same plane, so as to provide different or related image information, respectively. The first imaging surface 122 of the display panel 120 receives the first illumination beam L1 to be converted into a first image beam I1, and the second imaging surface 124 of the display panel 120 receives the second illumination beam L2 to be converted into a second image beam 12.

More specifically, the first illumination system 110a includes a first light source 112a, a collimating lens 114a, a lens 115a, a lens 117a, and a mirror 119a. The collimating lens 114a is located on the transmission path of the first illumination beam L1 from the first light source 112a and configured for collimating the first illumination beam L1. According to some embodiments, the collimating lens 114a makes the divergence angle of the collimated first illumination beam L1 less than 1°, but other suitable angles may also be used according to system requirements, and the disclosure is not limited thereto. The first light source 112a of the first illumination system 110a emits the first illumination beam L1, and the first illumination beam L1 passes by the collimating lens 114a, the lens 115a, the lens 117a, and the mirror 119a in sequence and is reflected by the mirror 119a to the first imaging surface 122 of the display panel 120. By adjusting the configuration of the first light source 112a, the collimating lens 114a, the lens 115a, the lens 117a and the mirror 119a, especially the angle of the mirror 119a, the incident angle at which the first illumination beam L1 is incident to the first imaging surface 122 can be adjusted to a first incident angle A1. That is, the first illumination beam L1 is incident to the first imaging surface 122 of the display panel 120 at the first incident angle A1, and the first imaging surface 122 of the display panel 120 converts the first illumination beam L1 into the first image beam I1.

According to some embodiments, the first illumination beam L1 may be monochromatic light or polychromatic light, but the disclosure is not limited thereto. According to some embodiments, the first light source 112a of the first illumination system 110a includes one or more light-emitting elements. The quantity of light-emitting elements can be determined according to requirements, which is not limited in the disclosure. According to some embodiments, the light-emitting element is a light-emitting diode, a laser diode, or other elements with similar properties, but the disclosure is not limited thereto.

Referring to FIG. 1B again, the second illumination system 110b includes a second light source 112b, a collimating lens 114b, a lens 115b, a mirror 117b, and a lens 119b. The collimating lens 114b is located on the transmission path of the second illumination beam L2 from the second light source 112b and configured for collimating the second illumination beam L2. According to some embodiments, the collimating lens 114b makes the divergence angle of the collimated second illumination beam L2 less than 1°, but other suitable angles may also be used according to system requirements, and the disclosure is not limited thereto. The second light source 112b of the second illumination system 110b emits the second illumination beam L2, and the second illumination beam L2 passes by the collimating lens 114b, the lens 115b, the mirror 117b, and the lens 119b in sequence and is incident to the second imaging surface 124 of the display panel 120. By adjusting the configuration of the second light source 112b, the collimating lens 114b, the lens 115b, the mirror 117b, and the lens 119b, the incident angle at which the second illumination beam L2 is incident to the second imaging surface 124 can be adjusted to a second incident angle A2. That is, the second illumination beam L2 is incident to the second imaging surface 124 of the display panel 120 at the second incident angle A2, and the second imaging surface 124 of the display panel 120 converts the second illumination beam L2 into the second image beam I2.

According to some embodiments, the second illumination beam L2 may be monochromatic light or polychromatic light, but the disclosure is not limited thereto. According to some embodiments, the second illumination beam L2 and the first illumination beam L1 may be the same color light or may be different color light, but the disclosure is not limited thereto. According to some embodiments, the second light source 112b includes one or more light-emitting elements. The quantity of light-emitting elements can be determined according to requirements, which is not limited in the disclosure. According to some embodiments, the quantity of light-emitting elements of the second light source 112b may be the same as or different from the quantity of light-emitting elements of the first light source 112a, but the disclosure is not limited thereto. According to some embodiments, the light-emitting element is a light-emitting diode, a laser diode, or other elements with similar properties, but the disclosure is not limited thereto.

As shown in FIG. 1B, the transmission path of the first illumination beam L1 incident to the first imaging surface 122 does not intersect with the transmission path of the second illumination beam L2 incident to the second imaging surface 124. The first image beam I1 exit the display panel 120 at a first light-emitting angle B1 and the second image beam I2 exit the display panel 120 at a second light-emitting angle B2. The first light-emitting angle B1 is the angle between the direction in which the first illumination beam L1 exit the display panel 120 and the normal line N of the display panel 120, and the second light-emitting angle B2 is the angle between the direction in which the first illumination beam L1 exit the display panel 120 and the normal line N of the display panel 120. The first light-emitting angle B1 is different from the second light-emitting angle B2. That is, the first image beam I1 and the second image beam I2 exit the first imaging surface 122 and the second imaging surface 124 of the display panel 120 at different light-emitting angles, respectively.

The first incident angle A1 of the first illumination beam L1 incident to the first imaging surface 122 is different from the second incident angle A2 of the second illumination beam L2 incident to the second imaging surface 124, so the optical paths of the first illumination beam L1 and the second illumination beam L2 may interfere, making part of the first illumination beam L1 incident to the second imaging surface 124 or part of the second illumination beam L2 incident to the first imaging surface 122 and further resulting in generation of unnecessary stray light and ghost images in the subsequent images. Therefore, as shown in FIG. 1B, the mirror 119a of the first illumination system 110a is disposed between the first illumination system 110a and the second illumination system 110b, and the transmission path of the first illumination beam L1 incident to the first imaging surface 122 and the optical path of the second illumination beam L2 incident to the second imaging surface 124 do not intersect with each other. The mirror 119a is implemented as a flat mirror, for example, disposed between the two illumination systems through a casing (e.g., the casing 400 of FIG. 1A) fixed to the head-up display device. For detailed description, the mirror 119a is disposed on one side of the display panel 120, for example, and can be tilted relative to the display panel 120 according to the actual optical path, so that the first illumination beam L1 reflected by the mirror 119a is incident to the first imaging surface 122 of the display panel 120 at the first incident angle A1. The configuration of the mirror 119a can effectively block the interference of the first illuminating beam L1 and the second illuminating beam L2 on the optical paths of the first imaging surface 122 and the second imaging surface 124, and meanwhile the configuration of the mirror of the first illumination system 110a is also provided to meet the limitation of the required first incident angle A1 at which the first illumination beam L1 emitted by the first illumination system 110a is incident to the first imaging surface 122.

According to some embodiments, the reflecting surface of the mirror 119a can reflect the first illumination beam L1, and the other surface of the mirror 119a, that is, the opposite surface of the reflecting surface, has a light absorbing element to absorb the second illumination beam L2 incident to the mirror to prevent the stray light generated in the optical path of the second illumination beam L2 from entering the optical path of the first illumination beam L1 or entering the first imaging surface 122 of the display panel 120.

Furthermore, referring to FIG. 1A, FIG. 2A, FIG. 2B, and FIG. 2C altogether, the first image beam I1 and the second image beam I2 emitted from the image generating unit 100 are successively transmitted to the at least one mirror 200 and the rotary structure module 300. In the embodiment, the rotary structure module 300 includes a curved mirror assembly 310, at least one bracket (two brackets 320 and 330 are schematically shown), and a driving element 340. The curved mirror assembly 310 includes a curved mirror 312, a fixing frame 314, a rotating shaft 316, and a counterweight 318. The first image beam I1 and the second image beam I2 are transmitted to a target element 20 via the mirror 200 and the curved mirror assembly 310 sequentially to form a first virtual image M1 and a second virtual image M2, respectively. The target element 20 is, for example, a windshield of an automobile. Meanwhile, the mirror 200 includes a first imaging mirror 210 and a second imaging mirror 220. The first image beam I1 is transmitted to the curved mirror 312 of the curved mirror assembly 310 via the first imaging mirror 210, the second image beam I2 is transmitted to the curved mirror 312 of the curved mirror assembly 310 via the second imaging mirror 220, and the first image beam I1 and the second image beam I2 are transmitted to the target element 20 by the reflection of the curved mirror 312 to form the first virtual image M1 and the second virtual image M2, respectively. The first image beam I1 and the second image beam I2 are reflected by the target element 20 to eyes E of the viewer (e.g., the driver of the vehicle), the viewer can view the first virtual image M1 and the second virtual image M2 with different imaging distances and different driving information in front of the target element 20 (the windshield). That is, the first virtual image M1 and the second virtual image M2 display different image information, respectively, and the first virtual image M1 and the second virtual image M2 have different imaging distances relative to the target element 20. According to some embodiments, the first virtual image M1 formed by the first image beam I1 may include fixed driving information, such as vehicle speed, fuel level, mileage, and speed limit; the second virtual image M2 formed by the second image beam I2 may include driving information in accordance with the environmental road conditions, such as left and right turn symbols, landmark information, warning symbols, etc.; and the disclosure is not limited thereto.

Furthermore, referring to both FIG. 2D and FIG. 2F, the curved mirror assembly 310 has a rotation axis X. The rotation axis X corresponds to the rotating shaft 316, and the rotating shaft 316 passes through the fixing frame 314. The curved mirror 312 and the counterweight 318 are fixed on two opposite sides of the fixing frame 314 and on two sides of the rotating shaft 316, respectively, and the center of gravity G of the curved mirror assembly 310 is overlapped with the rotational axis X by the configuration of the counterweight 318. The axial torque on the rotating shaft is $\vec{T}=\vec{R}\times\vec{F}$, where R is the displacement vector from the rotating shaft to the point of force application, and F is the applied force vector. When the curved mirror assembly 310 includes the counterweight 318, the center of gravity G of the curved mirror assembly 310 is overlapped with the rotation axis X, and R=0, so the torque T=0. That is, the curved mirror assembly 310 does not generate external torque. In more detail, the curved mirror 312 and the counterweight 318 are located on the right side and the left side of the fixing frame 314 in FIG. 2F, respectively and on the right side and the left side of the rotating shaft 316 in FIG. 2F, respectively.

Furthermore, the brackets 320 and 330 are sleeved on the rotating shaft 316. The bracket 320 has an assembly hole 322, the bracket 330 has an assembly hole 332, and opposite ends 317 and 319 of the rotating shaft 316 pass through the assembly holes 322 and 332 of the two brackets 320 and 330, respectively. Referring to FIG. 2E, the rotary structure module 300 of the embodiment further includes multiple locking elements 350, the counterweight 318 has multiple first locking holes H1, and the fixing frame 314 has multiple second locking holes H2. The locking elements 350 each pass through the first locking hole H1 of the counterweight 318 and the second locking hole H2 of the fixing frame 314 to lock the counterweight 318 to the fixing frame 314. That is, the counterweight 318 and the fixing frame 314 are fixed together through the locking element 350, and the locking element 350 is, for example, a screw or a bolt. In addition, the curved mirror 312 can be fixed to the other side of the fixing frame 314 by gluing or snapping, for example.

In addition, referring to FIG. 2D again, for example, the driving element 340 is a small torque motor or a low reduction ratio gear to drive the curved mirror assembly 310, then the curved mirror 312 rotates around the rotating shaft 316 as the rotation axis X to adjust the incident angle of the curved mirror 312 relative to the first image beam I1 (refer to FIG. 1A) and the second image beam I2 (refer to FIG. 1A), and the first image beam I1 (refer to FIG. 1A) and the second image beam I2 (refer to FIG. 1A) are further controlled to be incident to the position where the target element 20 is disposed. In addition, referring to FIG. 1A, FIG. 2D, FIG. 2G, and FIG. 2H altogether, the brackets 320 and 330 and the driving element 340 of the rotary structure module 300 of the embodiment are locked on the casing 400 through screws 500, so that the rotary structure module 300 is fixed on the casing 400 and the curved mirror 312 can rotate relative to the casing 400. FIG. 2G and FIG. 2H illustrate, for example, part of the casing 400.

In short, the curved mirror 312 and the counterweight 318 of the embodiment are fixed on two opposite sides of the fixing frame 314 respectively and on two sides of the rotating shaft 316 respectively, and the center of gravity G of the curved mirror assembly 310 is overlapped with the rotation axis X, so the curved mirror assembly 310 does not generate external torque. Furthermore, since the design of the rotary structure module 300 in the embodiment can prevent external torque caused by the eccentricity of the curved mirror 312, the driving element 340 can be selected from a smaller torque motor or a low reduction ratio gear, which can effectively reduce production costs and design complexity. In addition, the head-up display device 10 using the rotary structure module 300 of the embodiment can provide good display quality.

In summary, the embodiments of the disclosure have at least one of the following advantages or effects. In the design of the rotary structure module of the disclosure, the curved mirror assembly includes a counterweight; the curved mirror and the counterweight are fixed on two opposite sides of the fixing frame respectively and located on two sides of the rotating shaft respectively; and the center of gravity of the curved mirror assembly is overlapped with the rotation axis. Accordingly, external torque caused by eccentricity of the curved mirror can be prevented, and production cost and design complexity can be reduced. In addition, the head-up display device using the rotary structure module of the disclosure can provide good display quality.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A rotary structure module, applied to a head-up display device, comprising: a curved mirror assembly, at least one bracket, and a driving element,
    wherein the curved mirror assembly has a rotation axis, and the curved mirror assembly comprises a curved mirror, a fixing frame, a rotating shaft, and a counterweight, wherein the rotation axis corresponds to the rotating shaft, the rotating shaft passes through the fixing frame along a direction parallel to the rotation axis,
    wherein the curved mirror and the counterweight are fixed on two opposite sides of the fixing frame respectively and are located at two sides of the rotating shaft, and a center of gravity of the curved mirror assembly is overlapped with the rotation axis, wherein the curved mirror, the fixing frame, and the counterweight are disposed sequentially in an arrangement direction perpendicular to the rotation axis,
    wherein in the arrangement direction, an orthogonal projection of the counterweight on the fixing frame partially overlaps an orthogonal projection of the rotating shaft on the fixing frame;
    the at least one bracket is sleeved on the rotating shaft; and
    the driving element drives the curved mirror assembly so that the curved mirror rotates around the rotating shaft as the rotation axis.

2. The rotary structure module according to claim 1, wherein a number of the at least one bracket is two, each of the two brackets has an assembly hole, and two opposite ends of the rotating shaft pass through the assembly holes of the two brackets respectively.

3. The rotary structure module according to claim 1, further comprising:
    a plurality of locking elements, wherein the counterweight has a plurality of first locking holes, the fixing frame has a plurality of second locking holes, and one of the locking elements passes through one of the first locking holes and one of the second locking holes to lock the counterweight on the fixing frame.

4. The rotary structure module according to claim 1, wherein the driving element comprises a torque motor or a reduction ratio gear.

5. A head-up display device, comprising an image generating unit, at least one mirror, and a rotary structure module,
    wherein the image generating unit comprises at least one illumination system and a display panel, the at least one illumination system provides at least one illumination beam to be transmitted to the display panel, the display panel has a first imaging surface and a second imaging surface disposed adjacent to each other and located on a same plane, and the first imaging surface and the second imaging surface of the display panel receive the at least one illumination beam to be converted into a first image beam and a second image beam, respectively; and
    the rotary structure module comprises a curved mirror assembly, at least one bracket, and a driving element, wherein the first image beam and the second image beam are transmitted to a target element via the at least one mirror and the curved mirror assembly sequentially to form a first virtual image and a second virtual image, respectively,
    wherein the curved mirror assembly has a rotation axis, the curved mirror assembly comprises a curved mirror, a fixing frame, a rotating shaft, and a counterweight, the rotation axis corresponds to the rotating shaft, the rotating shaft passes through the fixing frame along a direction parallel to the rotation axis, and the curved mirror and the counterweight are fixed on two opposite sides of the fixing frame respectively and located on two sides of the rotating shaft respectively, so that a center of gravity of the curved mirror assembly is overlapped with the rotation axis, wherein the curved mirror, the fixing frame, and the counterweight are disposed sequentially in an arrangement direction perpendicular to the rotation axis, wherein in the arrangement direction, an orthogonal projection of the counterweight on the fixing frame partially overlaps an orthogonal projection of the rotating shaft on the fixing frame;

the at least one bracket is sleeved on the rotating shaft; and the driving element drives the curved mirror assembly, so that the curved mirror rotates around the rotating shaft as the rotation axis to adjust an incident angle of the curved mirror relative to the first image beam and the second image beam.

6. The head-up display device according to claim 5, wherein a number of the at least one bracket is two, each of the two brackets has an assembly hole, and two opposite ends of the rotating shaft pass through the assembly holes of the two brackets respectively.

7. The head-up display device according to claim 5, wherein the rotary structure module further comprises:
  a plurality of locking elements, wherein the counterweight has a plurality of first locking holes, the fixing frame has a plurality of second locking holes, and one of the locking elements passes through one of the first locking holes and one of the second locking holes to lock the counterweight on the fixing frame.

8. The head-up display device according to claim 5, wherein the driving element comprises a torque motor or a reduction ratio gear.

9. The head-up display device according to claim 5, further comprising:
  a casing, the image generating unit, the at least one mirror, and the rotary structure module disposed in the casing, wherein the at least one bracket and the driving element are locked to the casing through screws.

10. The head-up display device according to claim 5, wherein the at least one mirror comprises a first imaging mirror and a second imaging mirror, the at least one illumination system comprises a first illumination system and a second illumination system, and the at least one illumination beam comprises a first illumination beam and a second illumination beam;
  the first illumination system is configured to provide the first illumination beam, the first illumination beam is incident to the first imaging surface of the display panel at a first incident angle, and the first imaging surface converts the first illumination beam into the first image beam;
  the second illumination system is configured for providing the second illumination beam, the second illumination beam is incident to the second imaging surface of the display panel at a second incident angle, and the second imaging surface converts the second illumination beams into the second image beam;
  a transmission path of the first illumination beam incident to the first imaging surface and a transmission path of the second illumination beam incident to the second imaging surface do not intersect, and the first image beam and the second image beam exit the display panel at different light-emitting angles; and
  the first image beam and the second image beam are transmitted to the curved mirror of the curved mirror assembly via the first imaging mirror and the second imaging mirror respectively and then transmitted onto the target element by the reflection of the curved mirror to form the first virtual image and the second virtual image, respectively.

11. The head-up display device according to claim 10, wherein the first virtual image and the second virtual image have different image information and different imaging distances relative to the target element.

* * * * *